Patented Nov. 9, 1948

2,453,460

UNITED STATES PATENT OFFICE 2,453,460

MANUFACTURE OF TETRAALKYL THIURAM MONOSULFIDE

Walter Arnold Robshaw, Wrexham, Wales, assignor to Monsanto Chemical Company, St. Louis, Mo., a corporation of Delaware No Drawing. Application September 16, 1944, Serial No. 554,552. In Great Britain May 9, 1944

5 Claims. (Cl. 260—567)

This invention relates to the manufacture of organic monosulfides. More particularly, this invention relates to the manufacture of thiuram monosulfides.

It has been proposed to prepare thiuram monosulfides by first preparing a thiuram disulfide and then converting the thiuram disulfide to the corresponding monosulfide by treatment with an aqueous alcoholic solution of an alkali or alkaline earth metal cyanide.

In accordance with the present invention it has now been found that a new and very convenient process for the manufacture of a thiuram monosulfide consists in oxidizing a soluble salt of a dithiocarbamic acid in the presence of a soluble cyanide. Thus, tetra alkyl thiuram monosulfides are obtained from the corresponding dialkyl dithiocarbamates by oxidation in the presence of a soluble cyanide.

The course of the reaction is not completely understood but the overall reaction is represented by the following equation:

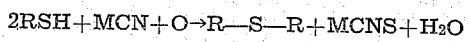

$$2RSH + MCN + O \rightarrow R\!-\!S\!-\!R + MCNS + H_2O$$

where M is an alkali or alkaline earth metal or ammonium and R is a thiocarbamyl radicle.

The process may be applied to the manufacture of monosulfides from inter alia the corresponding aralkyl dithiocarbamates, N-substituted cyclohexyl dithiocarbamates, heterocyclic dithiocarbamates, or substitution derivatives of these compounds.

The reaction may be carried out in aqueous or in aqueous alcoholic solution at temperatures from around 15° to 100° C.

The salts of the mercapto-containing compounds which have been found suitable for use in this process include those of ammonia, alkali metals, or organic nitrogen bases. The cyanide which may be that of ammonia, an alkali metal, or an alkaline earth metal may be used in the theoretical amount required by the partial equation set out above, or in excess of this amount.

Suitable oxidizing agents include water-soluble per-salts, such as ammonium or alkali metal persulfates, perborates, percarbonates or perphosphates. Hydrogen peroxide in acid solution, nitrous acid, ferricyanides, halogens, hypochlorites and hypobromites may also be used.

The oxidizing agent may be added to a solution of the mercapto salt and the cyanide or the solution of the mercapto salt and the cyanide may be added to the oxidizing agent.

Instead of starting with the preformed mercapto compounds, the present process may be carried out by forming the mercapto compound in situ.

Following is a description by way of example of methods of carrying the invention into effect.

Example I

A solution of sodium dimethyl dithiocarbamate was prepared by diluting substantially 45 parts by weight of 25% aqueous dimethyl amine (substantially 0.25 molecular proportion) with substantially 20 parts by weight of water and reacting with substantially 33.3 parts by weight of 30% sodium hydroxide (substantially 0.25 molecular proportion) and 19 parts by weight of carbon disulfide (substantially 0.25 molecular proportion). To the solution of sodium dimethyl dithiocarbamate so prepared a solution of 7.5 parts by weight of sodium cyanide in 67 parts by weight of water was added and the mixture oxidized with a solution of 31 parts by weight of ammonium persulfate in 125 parts by weight of water, allowing the temperature to rise to 50° C. The yellow crystalline product of tetramethyl thiuram monosulfide which had precipitated was filtered off, washed, and dried at 70° C. The yield was 23.4 parts by weight or 90% of theory, M. P. 108° C.

Example II 94 parts by weight of caustic soda was dissolved in 533 parts by weight of water and 400 parts by weight of 25% dimethyl amine added with stirring and cooling. 169 parts by weight of carbon disulfide was added over half-an-hour, allowing the temperature to rise to 22° C. After all the carbon disulfide had reacted, 58 parts by weight of sodium cyanide dissolved in 232 parts by weight of water was added. 280 parts by weight of ammonium persulfate dissolved in 834 parts by weight of water was then run in, checking the temperature rise at 40° C. Stirring was continued for 15 minutes and then the reaction product was cooled, centrifuged, washed, and dried at 60° C. Yield 218 parts by weight (93.5% theory), M. P. 109° C., color, bright yellow.

Example III

An aqueous solution of sodium dimethyl dithiocarbamate was prepared as in Example I and a solution of 6.7 parts by weight of sodium cyanide was added. Oxidation was then effected with 14.7 parts by weight of 30% hydrogen peroxide (substantially 0.13 molecular proportion) in 70.8 parts by weight of 18% sulfuric acid (substantially 0.13 molecular proportion). The product was filtered, washed and dried at 70° C. The yield of tetramethyl thiuram monosulfide was 23 parts by weight (88% theory), M. P. 108° C.

Since many embodiments of this invention, differing widely in one or more respects, may be made without departing from the spirit of this invention, it is to be understood that the invention is not limited to the foregoing examples or description.

The present invention is limited solely by the claims attached hereto as part of the present specification.

What is claimed is:

1. The process of manufacturing tetra alkyl thiuram monosulfides which consists in oxidizing an alkali metal salt of a dialkyl dithiocarbamic acid in the presence of an alkali metal cyanide.

2. The process of manufacturing tetra methyl thiuram monosulfide which consists in oxidizing an alkali metal salt of dimethyl dithiocarbamic acid in the presence of an alkali metal cyanide.

3. The process of manufacturing a thiuram monosulfide which consists in oxidizing an alkali metal salt of a dialkyl dithiocarbamic acid with hydrogen peroxide and mineral acid in the presence of an alkali metal cyanide.

4. The process of manufacturing tetra methyl thiuram monosulfide which consists in oxidizing an alkali metal salt of dimethyl dithiocarbamic acid with hydrogen peroxide and sulfuric acid in the presence of an alkali metal cyanide.

5. The process of manufacturing tetra methyl thiuram monosulfide which consists in oxidizing an alkali metal salt of dimethyl dithiocarbamic acid with a soluble persulfate in the presence of an alkali metal cyanide.

WALTER ARNOLD ROBSHAW.

REFERENCES CITED

The following references are of record in the file of this patent:

UNITED STATES PATENTS

| Number | Name | Date |
|---|---|---|
| 1,682,920 | Maximoff | Sept. 4, 1928 |
| 1,782,111 | Adams | Nov. 18, 1930 |
| 1,796,972 | Whitby | Mar. 17, 1931 |
| 1,796,977 | Bailey | Mar. 17, 1931 |
| 2,045,888 | Tschunkur | June 30, 1936 |